US010880865B2

(12) United States Patent
Henry et al.

(10) Patent No.: US 10,880,865 B2
(45) Date of Patent: Dec. 29, 2020

(54) PEER-TO-PEER NETWORKING INTERFERENCE REMEDIATION

(71) Applicant: Cisco Technology, Inc., San Jose, CA (US)

(72) Inventors: Jerome Henry, Pittsboro, NC (US); Robert Edgar Barton, Richmond (CA); Vishal Satyendra Desai, San Jose, CA (US); Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/365,030

(22) Filed: Mar. 26, 2019

(65) Prior Publication Data
US 2020/0314799 A1    Oct. 1, 2020

(51) Int. Cl.
*H04W 48/16*    (2009.01)
*H04W 72/00*    (2009.01)
(Continued)

(52) U.S. Cl.
CPC ......... *H04W 72/005* (2013.01); *H04W 8/005* (2013.01); *H04W 16/20* (2013.01);
(Continued)

(58) Field of Classification Search
CPC ............. H04W 72/005; H04W 72/082; H04W 72/0453; H04W 16/20; H04W 64/006; H04W 8/005; H04W 84/20; H04W 84/12
See application file for complete search history.

(56) References Cited

U.S. PATENT DOCUMENTS

2017/0208557 A1*    7/2017    Patil .................... H04W 72/121
2017/0366957 A1    12/2017    Oren et al.
(Continued)

FOREIGN PATENT DOCUMENTS

WO    2017123893 A2    7/2017
WO    2019005078 A1    1/2019

OTHER PUBLICATIONS

Milan Stute et al., "One Billion Apples' Secret Sauce: Recipe for the Apple Wireless Direct Link Ad hoc Protocol", arXiv:1808.03156v1 [cs.NI], https://arxiv.org/pdf/1808.03156.pdf, Aug. 9, 2018, 15 pages.
(Continued)

*Primary Examiner* — Walli Z Butt
(74) *Attorney, Agent, or Firm* — Edell, Shapiro & Finnan, LLC

(57) ABSTRACT

Presented herein are methodologies for managing radio resources in a venue that implements a high density wireless infrastructure. The methodology includes detecting, using wireless access points, neighbor awareness networking (NAN) communications broadcast by a mobile device, determining a wireless channel on which the mobile device is sending the NAN communications, predicting a destination of the mobile device based on a path, through a predetermined venue, being taken by the mobile device, the path being detected using the wireless access points; and implementing a radio resource management remediation technique to reduce radio interference that is expected to be caused by the NAN communications broadcast by the mobile device at the destination based on the wireless channel and the destination.

20 Claims, 6 Drawing Sheets

(51) Int. Cl.

| | |
|---|---|
| H04W 8/00 | (2009.01) |
| H04W 64/00 | (2009.01) |
| H04W 72/08 | (2009.01) |
| H04W 16/20 | (2009.01) |
| H04W 72/04 | (2009.01) |
| H04W 84/20 | (2009.01) |
| H04W 84/12 | (2009.01) |

(52) U.S. Cl.
CPC ..... *H04W 64/006* (2013.01); *H04W 72/0453* (2013.01); *H04W 72/082* (2013.01); *H04W 84/12* (2013.01); *H04W 84/20* (2013.01)

(56) References Cited

U.S. PATENT DOCUMENTS

| | | | | |
|---|---|---|---|---|
| 2018/0077532 | A1 | 3/2018 | Wulff | |
| 2018/0352413 | A1* | 12/2018 | Gurram | H04L 67/16 |
| 2018/0376448 | A1* | 12/2018 | Wild | H04W 64/00 |
| 2020/0081091 | A1* | 3/2020 | Amin | H04W 64/00 |

OTHER PUBLICATIONS

Yanzi Zhu et al., "AdversarialWiFi Sensing using a Single Smartphone", arXiv:1810.10109v2 [cs.CR], https://arxiv.org/pdf/1810.10109.pdf, Nov. 20, 2018, 17 pages.

Julian Bock et al., "Self-learning Trajectory Prediction with Recurrent Neural Networks at Intelligent Intersections", DOI: 10.5220/0006374003460351, In Proceedings of the 3rd International Conference on Vehicle Technology and Intelligent Transport Systems (VEHITS 2017), pp. 346-351, ISBN: 978-989-758-242-4, http://www.scitepress.org/Papers/2017/63740/63740.pdf, Apr. 22-24, 2017, 6 pages.

Esther Calvo Fernandez et al., "DART: A Machine-Learning Approach to Trajectory Prediction and Demand-Capacity Balancing", Seventh SESAR Innovation Days, https://www.sesarju.eu/sites/default/files/documents/sid/2017/SIDs_2017_paper_65.pdf, Nov. 28-30, 2017, 8 pages.

Zhengyi Wang et al., "Short-term 4D Trajectory Prediction Using Machine Learning Methods", https://hal-enac.archives-ouvertes.fr/hal-01652041/document, Nov. 2017, 10 pages.

Nikolay Jetchev et aL., "Trajectory Prediction: Learning to Map Situations to Robot Trajectories", Proceedings of the 26th International Conference on Machine Learning, https://ipvs.informatik.uni-stuttgart.de/mlr/papers/09-jetchev-ICML.pdf, Aug. 26, 2009, 8 pages.

Angelos Valsamis et al., "Employing traditional machine learning algorithms for big data streams analysis: the case of object trajectory prediction", https://arxiv.org/pdf/1609.00203.pdf, Sep. 1, 2016, 14 pages.

Richard Wang et a., "Indoor Trajectory Identification: Snapping with Uncertainty", 2015 IEEE/RSJ International Conference on Intelligent Robots and Systems (IROS), https://www.cs.cmu.edu/~srini/papers/2015.Wang.iros.pdf, Sep. 28-Oct. 2, 2015, 6 pages.

Piotr Sapiezynski et al., "Tracking Human Mobility Using WiFi Signals", https://journals.plos.org/plosone/article?id=10.1371/journal.pone.0130824, Jul. 1, 2015, 7 pages.

Thor Prentow et al., "Making Sense of Trajectory Data in Indoor Spaces", https://pure.au.dk/ws/files/91026290/PID3645389.pdf, Jun. 15-18, 2015, 6 pages.

Ando Saabas, "Interpreting random forests", Diving into data, https://blog.datadive.net/interpreting-random-forests/, Oct. 19, 2014, 13 pages.

Wi-Fi Alliance, "Wi-Fi Aware", https://www.wi-fi.org/discover-wi-fi/wi-fi-aware, downloaded Mar. 21, 2019, 3 pages.

Wei Wang et al., "Understanding and Modeling of WiFi Signal Based Human Activity Recognition", MobiCom'15, Sep. 7-11, 2015, 12 pages.

Martin Werner et al., "Reliable Trajectory Classification Using Wi-Fi Signal Strength in Indoor Scenarios", https://ieeexplore.ieee.org/document/6851429, May 5-8, 2014, 8 pages.

International Search Report and Written Opinion in counterpart International Application No. PCT/US2020/023484, dated Jun. 19, 2020, 15 pages.

\* cited by examiner

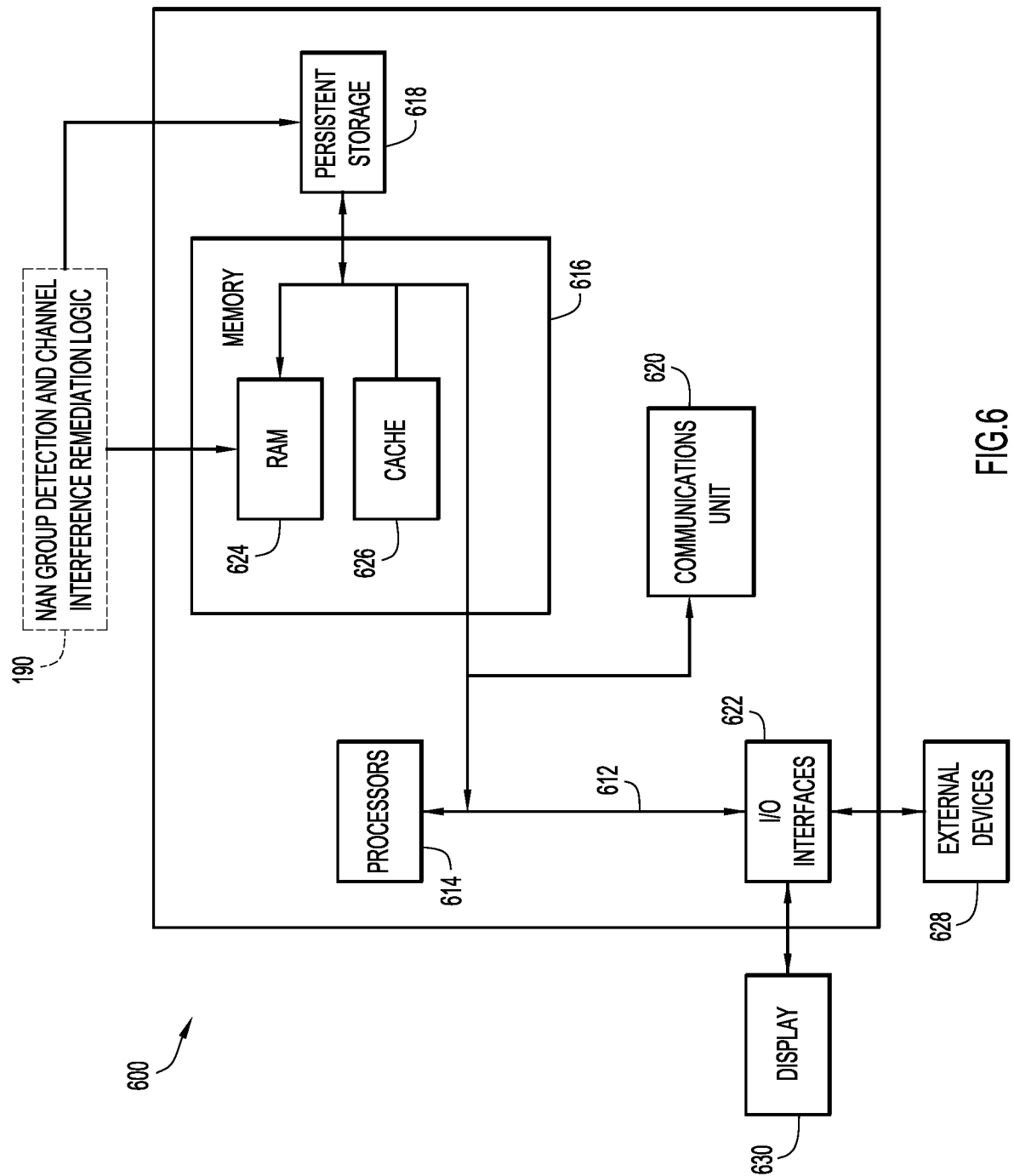

PEER-TO-PEER NETWORKING INTERFERENCE REMEDIATION

TECHNICAL FIELD

The present disclosure relates to monitoring mobile peer-to-peer networking groups and implementing remediation techniques to alleviate potential interference caused by such groups.

BACKGROUND

Wi-Fi Aware, also known as "Neighbor Awareness Networking" (NAN), allows mobile stations (STAs), such as mobile phones in proximity to one another, to form peer groups and exchange information directly, without necessarily relying on an access point (AP) as an intermediary node. The goal of NAN is to organize peer-to-peer (P2P) groups, where individual devices may want to exchange information on a topic of common interest.

In operation, a single NAN device sends discovery messages on known channels. Until groups are formed, these messages are not synchronized between devices, resulting in the potential of high channel noise. Once NAN devices hear one another, they meet at an interval (a rendezvous point in time) decided by an elected group leader. At that point, the devices are synchronized in time. At the rendezvous point in time, a discovery window allows the NAN group participants to exchange information on services that they may want to share. If they have nothing to share, then they have no reason to stay in the same group. Therefore, if no mutual interest is found, a NAN device can disengage from the group and attempt to discover and synchronize with other groups. Devices that have "things to share" will likely stay in the group. "Things to share" can be any type of data, from "I am a Minecraft player and will share my scores" to "Jerome family, group to exchange photos". In such cases, interested members of the group will subscribe to the service (whatever is shared), and the offering STA will give another rendezvous point in time (typically on the same channel) where that service will be offered.

BRIEF DESCRIPTION OF THE DRAWINGS

FIG. 6 depicts a device (e.g., a server) that might host and execute NAN group detection and channel interference remediation logic in accordance with an example embodiment.

DESCRIPTION OF EXAMPLE EMBODIMENTS

Overview

Figure 1:
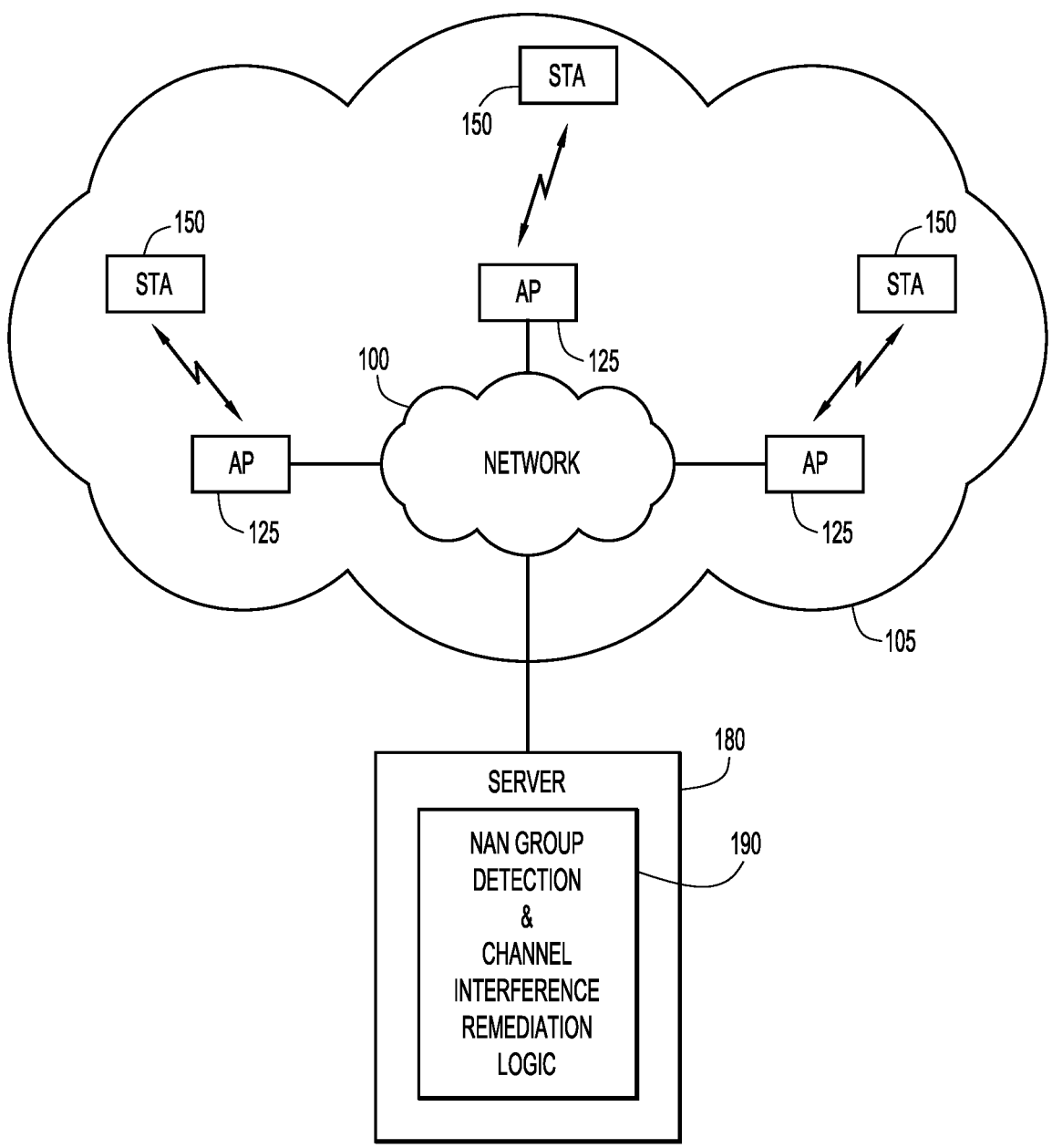
FIG. 1 depicts components of a network, including access points, mobile stations and NAN group detection and channel interference remediation logic in accordance with an example embodiment.

Presented herein are methodologies for managing radio resources in a venue that implements a high density wireless infrastructure. The methodology includes detecting, using wireless access points, neighbor awareness networking (NAN) communications broadcast by a mobile device, determining a wireless channel on which the mobile device is sending the NAN communications, predicting a destination of the mobile device based on a path, through a predetermined venue, being taken by the mobile device, the path being detected using the wireless access points, and implementing a radio resource management remediation technique to reduce radio interference that is expected to be caused by the NAN communications broadcast by the mobile device at the destination based on the wireless channel and the destination.

A device or apparatus is also described. The device may include an interface unit configured to enable network communications, a memory, and one or more processors coupled to the interface unit and the memory, and configured to: detect, using wireless access points, neighbor awareness networking (NAN) communications broadcast by a mobile device, determine a wireless channel on which the mobile device is sending the NAN communications, predict a destination of the mobile device based on a path, through a predetermined venue, being taken by the mobile device, the path being detected using the wireless access points, and implement a radio resource management remediation technique to reduce radio interference that is expected to be caused the NAN communications broadcast by the mobile device at the destination based on the wireless channel and the destination.

EXAMPLE EMBODIMENTS

Wi-Fi Aware, also known as "Neighbor Awareness Networking" (NAN), allows mobile stations (STAs), such as mobile phones in proximity to one another, to form peer groups and exchange information directly, without necessarily relying on an access point (AP) as an intermediary node. The NAN communication mode is anticipated to be widely adopted. However, NAN presents considerable challenges in managed high-density networks, such as a stadium environment. Specifically, given that NAN groups form and dissolve, and STAs are mobile, peer-to-peer (P2P) channels can become congested, and thus collisions can increase not only between P2P groups themselves, but also potentially between the P2P groups and wireless infrastructure cells.

The P2P channels may be avoided entirely by the managed infrastructure AP, however, this scheme is impractical for several reasons.

For example, in the 2.4 GHz band, there are only three non-overlapping channels, and losing even one entire channel is a major challenge, in that it is very difficult, if not impossible, to ensure comprehensive coverage with only 2 channels without major overlapping base station subsystem (OBSS) collisions.

Also, NAN determines a primary advertisement channel (e.g., ch 6 in 2.4 GHz; ch 149 or 40 in 5 GHz), but data exchange can be set to use other channels, making NAN activity detection and avoidance difficult.

To optimize radio resource management (RRM), it would be beneficial to predict the location of NAN activity, and react in a manner that can reduce the likelihood of interference caused by a NAN group's activity. The embodiments described herein provide approaches for such prediction, and further provide prophylactic management techniques in an effort to minimize interference in the wireless infrastructure caused by established NAN groups.

NAN primarily functions with 3 phases, as follows:

1. Rendezvous: in this phase (phase 1), a STA starts and broadcasts rendezvous point information (specific channel and specific time).

2. Service exchange: in this phase (phase 2), two or more NAN devices meet on the specific channel at the specific point in time and exchange information on services they can offer (e.g. "Rob's family picture sharing").

3. Data exchange: in this phase (phase 3), NAN devices that share the same service interest exchange data. This can occur on the rendezvous channel or on another channel determined during phase 2.

In accordance with an embodiment, phase 1 signals emitted by NAN-capable STAs are detected as the STAs enter a predetermined venue having a managed high-density network (e.g., stadium, conference center, etc.).

More specifically, reference is made to FIG. 1, which depicts components of a network 100, including access points (APs) 125, mobile stations (STAs) 150 and NAN group detection and channel interference remediation logic 190 hosted on a server 180.

As NAN-capable STAs 150 move through the facility or predetermined venue 105, a probabilistic machine (which may be implemented as part of NAN group detection and channel interference remediation logic 190) determines the likely trajectories of the user (i.e., the user of a given STA 150). Suppose a user enters a stadium, and walks through constrained entry points (entrances/doors). As long as the STA 150 is awake, and assuming at least one application is running on the STA 150 that has enabled NAN, STA 150 will send NAN discovery messages. Such NAN discovery messages are picked up by the wireless infrastructure. There will be many STAs 150 going through entry points, and sending NAN discovery messages. By keeping track of the paths that individual STAs 150 take (by tracking each STA using respective APs 125 deployed along effectively all possible paths), a machine learning technique (again, implemented as part of NAN group detection and channel interference remediation logic 190) can learn pathway patterns, and can be configured to thus predict, for a given new STA 150, which path it might likely take, and thus at which, e.g., seating section, the given new STA 150 will finally arrive.

Figure 2:
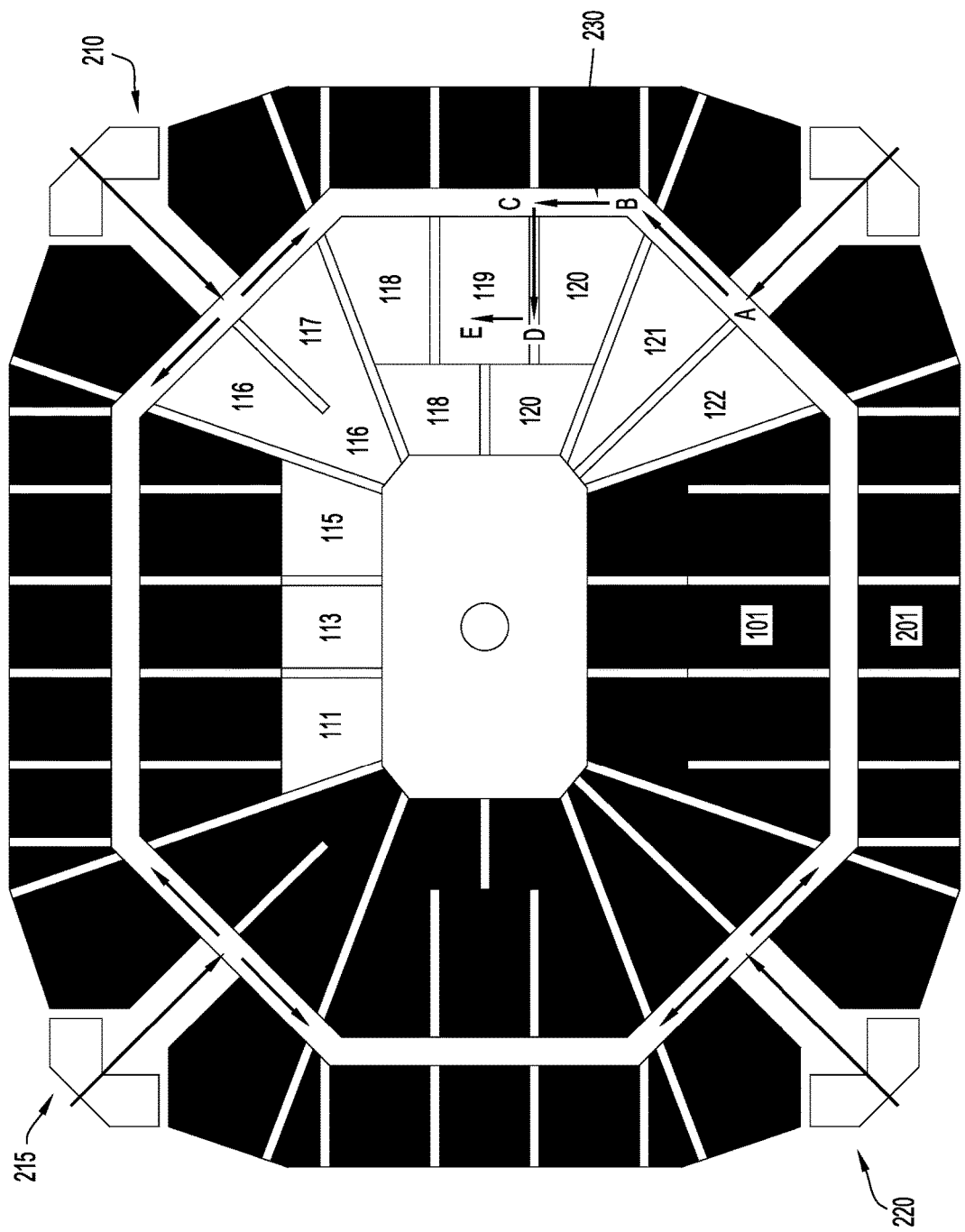
FIG. 2 depicts tracking a given STA in a stadium venue in accordance with an example embodiment.

FIG. 2 depicts tracking a given STA in a stadium venue in accordance with an example embodiment. As shown, there are many possible users and trajectories, and many users may follow trajectories along the paths 210, 215, 220, but the following discussion focuses on a STA following the trajectory 230.

When a STA is detected at point A in FIG. 2, it can be determined from a prior machine learning training set that the STA is, e.g., unlikely to go through walls (although location imprecision or staff shortcuts may provide such visual overlaps on the map), and is, instead, likely to go up to any zone up to seating area 119, or go left to a zone up to 101 or 201. This is known because it may be learned that users walking, for example, to area 117, tend to enter by the upper right entrance. In other words, the possible trajectories and their probabilities can be known from the training set.

There is, of course, a low probability that a user will use the lower right entrance of the stadium, and nevertheless go all the way to, e.g., seating area 117. Determining this type of probability may be accomplished using, e.g., a random forest technique.

Thus, when a user enters the stadium through the lower right door, a model predicts that the user can only go to A, then can turn left or right. Depending on the size of the training set, the model can determine the probability of the user going up or down. The probabilities should be about 0.5 for up, 0.5 for down. Similarly, at point A, there will be a distribution of probabilities that the user may end up in area 120, 121, 122 etc.

As the user progresses along the path 230 through points B and C, the probability that the user will end up in area 119 increases, while the probability that the user changes their mind and ends up, e.g., in area 101 decreases. At point D, the probability that the user will end up in 119 or 120 is very high, and the probability that the user will end up anywhere else gets lower.

The above learning process is particularly helpful in the context of the instant embodiments, because not all APs 125 on the path are on the rendezvous channel (i.e., rendezvous messages are detected by a subset of the APs 125), and not all APs are on the communication channel of each group. However, by coordinating location, trajectory and phases 1, 2 and 3 detection, the NAN group detection and channel interference remediation logic 190 can detect individual groups and their characteristics (member count, location, activity volume and channel).

The result of the learning can be displayed as an overlay on a map (see, e.g., FIG. 3), to provide an administrator with visibility into location and channels of P2P nodules, and their expected effect on the Wi-Fi infrastructure service.

It is noted that the predictive component of the described embodiments help in that:
- NAN discovery channels are fixed (one channel in 2.4 GHz, one channel in 5 GHz which is regulatory-domain-dependent);
- NAN groups can then communicate on a channel different from the discovery channel; and
- It is a goal to not just try to locate a device, but to determine if NAN groups are formed and are present in a particular location.

NAN Groups

There are two types of NAN groups: longer lasting groups ("Rob's family") and ad hoc groups formed around a shared topic ("hot dog lover", "Minecraft player" etc.).

Consider a group of friends, or a family going to see a game. They may meet directly at the seating area (this probability exists), or they may meet at the stadium or even come together (both probabilities exist). This information is used to locate the group and their members on their trajectory to their seats.

Suppose that the NAN discovery channel is 44. As noted above, not all APs 125 on the path between the lower right entrance and seating area 119 will be on channel 44. Additionally, a NAN group may form and exchange data on the discovery channel, or may form on the discovery channel and meet on another channel to exchange data.

Longer Lasting Groups

Consider a group including "Rob" and his two children who meet at the entrance of the stadium. Each has a phone, and all three phones are likely members of the Rob's family NAN group. As the group progresses along path 230 in FIG. 2, it will pass one or more APs 125 on channel 44, and quite a few other APs 125 on other channels. As the STAs pass the AP 125 on channel 44, the group will be detected (by, e.g., monitoring NAN discovery messages). Because this is a permanent group, the phones will stay in the NAN group, and exchange occasional synchronization data. This synchronization data exchange may happen on the NAN discovery channel (44), or on another channel.

In short, the NAN group is maintained by rendezvous points at regular intervals, at which service information is confirmed (i.e., we are in the same family), then rendezvous points for data exchange are set where, a short burst of exchange will confirm what data is being shared (e.g., picture, phone hotspot service, etc.). This happens at regular intervals, even when no one is sharing a picture with the others. In other words, the group does not need to exchange data to be active from a NAN standpoint.

In this case (Rob's family), the group forms and stays formed. As the group is detected by the AP on channel 44, the transit time through the AP cell is sufficient to identify that the group is formed and stays (STAs meet at rendezvous points, stay in sync with the group master etc.) In other words, on channel 44, the AP detects a NAN discovery window, a STA offering service, and one or more STA subscribing to the offered service. This suggests that this group will likely stay in a group formation. As this detection repeats on the subsequent APs (likely on channel 44) detecting the group, the confidence about the stability of the group increases.

This information is used by NAN group detection and channel interference remediation logic 190 to deduce the presence of one device from the presence of another. If Rob's phone is detected along the path, for example because Rob's MAC probed on channel 161 where an AP operates, then there is a probability equivalent to a group stability confidence that the other 2 phones are also progressing along the same path, even if they are not detected probing at the same time on that channel 161. In other words, NAN group detection and channel interference remediation logic 190 can infer the presence of the other members of the group by the detection of a member of the group, when the group stability confidence is high.

Ad hoc Groups

Consider, two sport fans just happen to be at the entrance of the stadium at the same time, and that they both have an application running on their phones that is NAN aware. Both phones will discover and meet on channel 44. Then a NAN group will form and will stay in sync, for the duration of the time when both phones are in range. This duration can be anywhere between a few seconds and, e.g., the time of a whole game (if both fans end up by chance sitting in range of one another). The probabilities here depend on the stadium environment and the group type. The longer the users are detected along a similar path, the higher the probability that detecting the trajectory of one can allow for the prediction of the trajectory of the other.

No NAN Groups

Consider a last, and third, case, where phones scan, discover and meet on channel 44, but do not find any compatible service to share. The behavior in this case is that each STA will fall off the group (no synchronization) and will look for other groups. As a crowd of people enter the venue, and passes in range of an AP on channel 44, this behavior can also be detected.

Because each of these three scenarios is a probability, and because computing real time certainty for a stadium full of people is difficult, probabilities are employed to predict NAN group location. The behavior depends on the stadium configuration, on local habits and other factors (e.g., in France, people would never meet inside the stadium, this would be considered impolite, so the training set would show that groups would in most cases form outside of the stadium and walk in together).

The behavior, and the chance of seeing a NAN group in seating area 119 (FIG. 2) is therefore a combination of multiple factors. This is the reason why NAN group detection and channel interference remediation logic 190 uses machine learning, to construct a probability for each event to occur, based on the observation of events over a large sample.

In other words, the NAN group detection and channel interference remediation logic 190, based on a training set, can determine trajectory probabilities, deduce the trajectory of a device based on the trajectory of another device and the detected stability of a NAN group associated to both devices, and in the end, based on the learned patterns for the stadium and the detected devices at the time of a stadium event, predict the likely destination of NAN groups.

With the foregoing prediction techniques, it is possible to determine the possible presence of a NAN group in, e.g., area 119 (FIG. 2), even if the NAN group is not detected directly in area 119 (e.g., because none of the APs in area 119 are on channel 44 or on the group's NAN data channels).

That is, it is possible, based on the described prediction techniques to tell with a high level of confidence that a stable NAN group detected along path 230 is, in fact, in area 119, even if that area does not have APs 125 on the NAN channels.

It is also possible to predict with a high level of confidence that the members of that groups are present, even if only a single member (or a subset of members) is detected.

Figure 3:
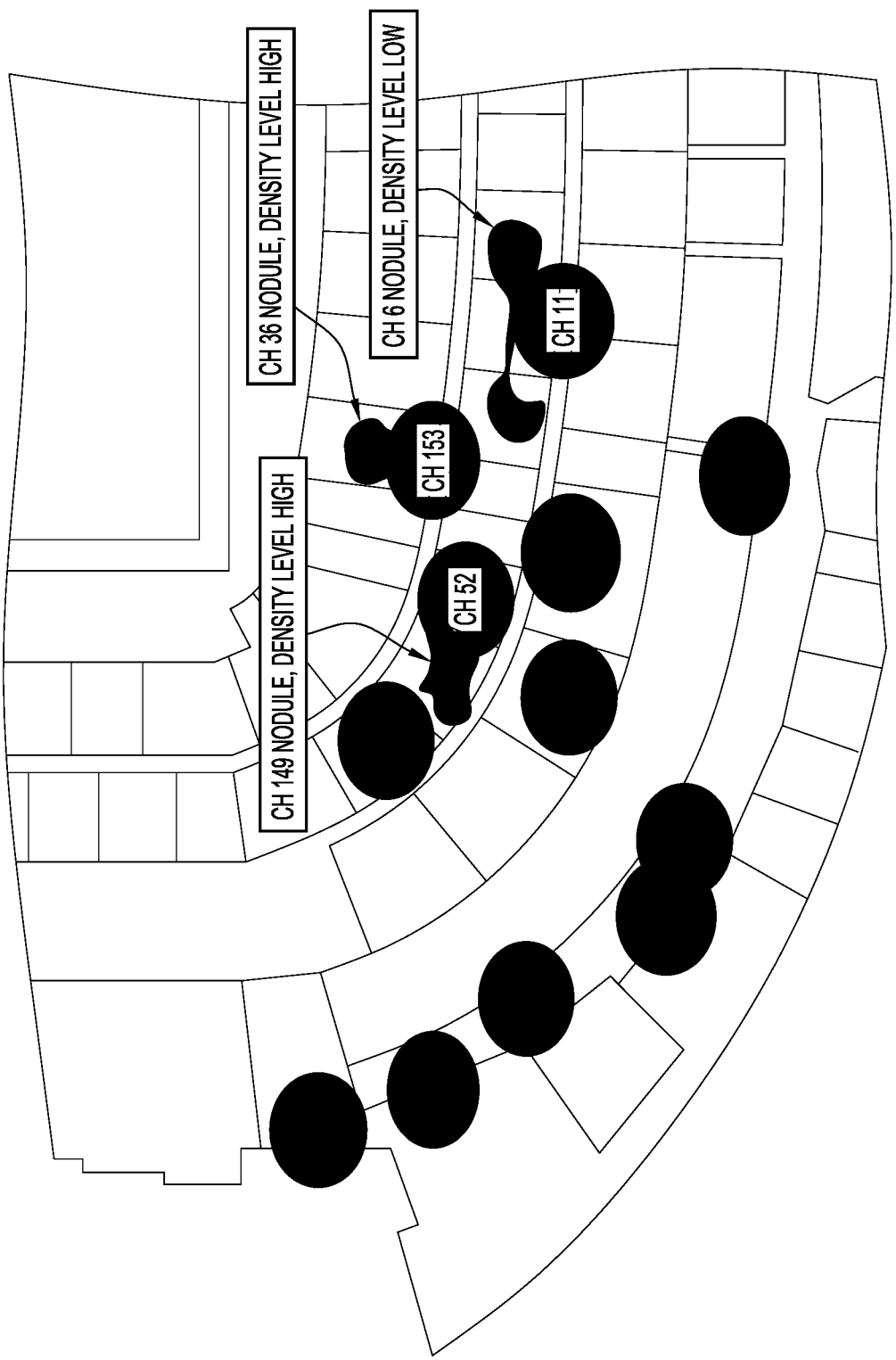
FIG. 3 shows NAN groups on particular channels overlaid on a partial stadium map including access points on particular channels in accordance with an example embodiment.

FIG. 3 shows NAN groups on particular channels overlaid on a partial stadium map including access points on particular channels in accordance with an example embodiment.

It is noted again that NAN discovery channels are not necessarily NAN data communication channels. As such, as users progress along the trajectories toward their seating areas, NAN communication is detected by APs 125 on the associated channels, but also direct communication between phones is detected by other APs (e.g., APs on ch 149, 11, 52 and 153 in FIG. 3). A STA and frame/s count per group may be used to determine a nodule density. FIG. 3 depicts a scenario in which APs close to the NAN groups do not share channels. NAN group detection and channel interference remediation logic 190 is configured, once a NAN group is predicted to be in a particular destination, to manage AP channel selection and/or perform other remediation techniques to reduce or avoid interference between NAN groups and proximate APs.

Channel Interference Remediation

Figure 4:
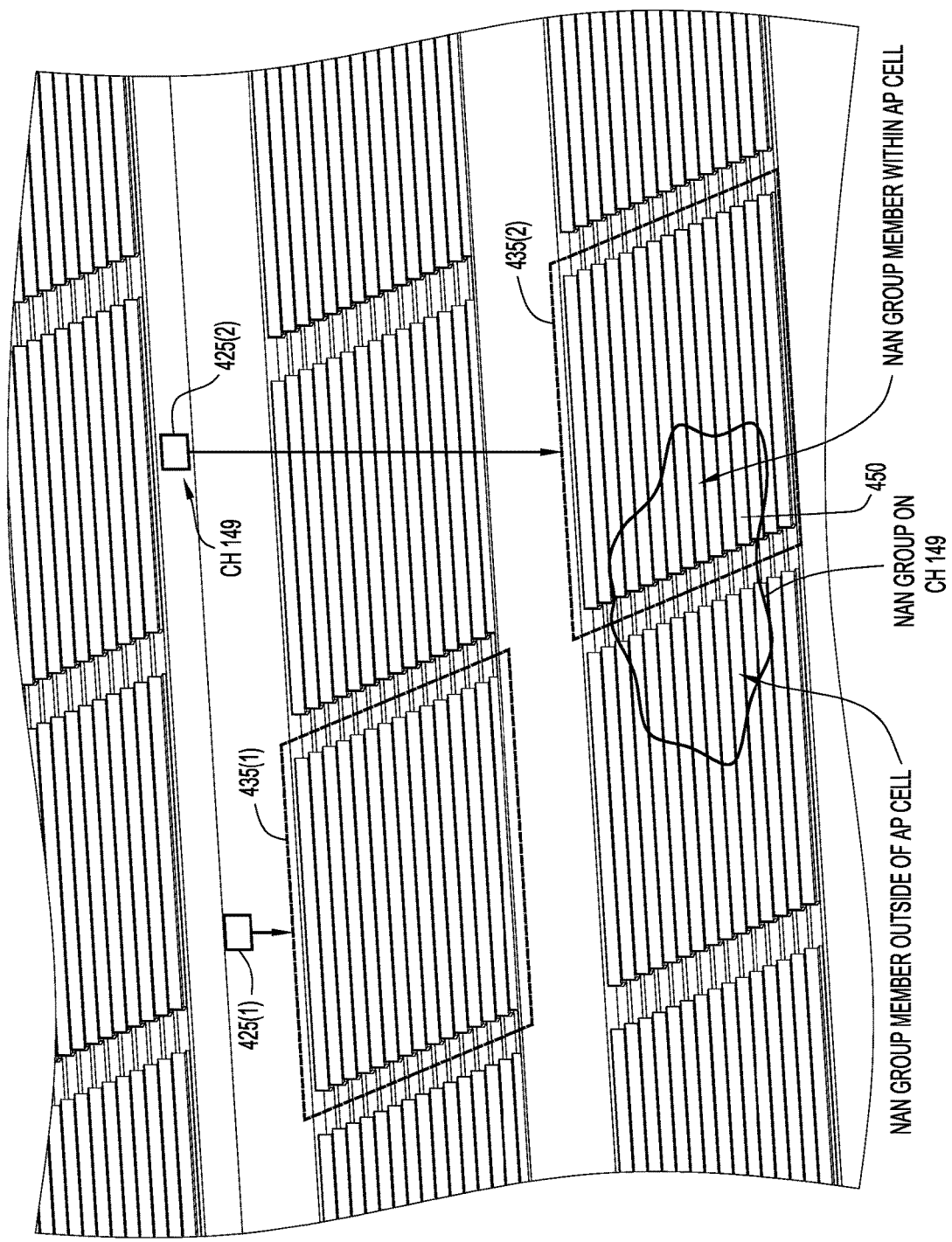
FIG. 4 shows adjacent or nearby access points in connection with discussing how NAN group detection and channel interference remediation logic might become aware of interference caused by a NAN group in accordance with an example embodiment.

In high-density network infrastructure venues such as stadiums, the Wi-Fi access points 125 typically use highly directional antennas due to the high density of users and the related need for controlled cell size and client count. The intended coverage typically results in a set of seats in a predetermined area, as shown in FIG. 4, in which AP 425(1) serves area 435(1) and nearby or adjacent AP 425(2) serves area 435(2). NAN group 450 may be operating on channel 149. Meanwhile AP 425(2) may also be operating on channel 149 and, thus, interference may occur. NAN group detection and channel interference remediation logic 190 may be made aware of poor communication between AP 425(2) and STAs in area 435(2) and, having predicted that NAN group 450 is located nearby, is configured to perform some form of radio resource management remediation to reduce or eliminate the interference caused by the interference in the AP 425(2) cell.

In this environment, the activity of NAN groups and their effect on the local cell is equivalent to the presence of an overlapping cell, in the following aspects:

When a NAN group communication channel is directly identical to the channel of the AP covering that same area, and when all NAN members are within the AP cell area, then normal CSMA/CA rules apply and the result is normal spectrum sharing. No special action may be expected in this case.

When NAN group members are in positions where only some of them are within the AP cell (as shown in FIG. 4), then standard hidden node issues occur.

In the example of FIG. 4, some members of the NAN group 450 are within area 435(2). Such members will communicate, respecting standard CSMA/CA techniques. On the other hand, some members are outside of coverage area 435(2) for AP 425(2). Those members do not detect the AP 425(2) traffic, and also do not detect the traffic from many members of the AP cell in area 435(2). As a result, traffic from NAN group 450 members in area 435(2) may collide with traffic from users in area 435(2) served by AP 425(2).

It is noteworthy that NAN does not describe any limit for a NAN group. Additionally, NAN allows for relaying, and is not strict on group member count. As a result, in a dense stadium scenario, it is very possible that large groups end up forming (large in terms of distance between members and in terms of member count). Therefore, the potential for disturbance is more than "just a pair of phones," as it depends on the implementation and the group types.

Thus, as noted, NAN group detection and channel interference remediation logic 190, once it has predicted the destination of a NAN group, is configured to undertake one or more channel interference remediation techniques in an attempt to avoid interference between NAN groups and nearby APs or APs having adjacent or overlapping coverage areas (where "nearby" means close enough to receive interfering transmissions from the NAN group).

There are several general approaches to remediate channel interference.

Approach (1): One way to avoid channel interference is to pre-emptively change the operating channel of an AP 125 that is nearby a predicted destination of a NAN group that happens to be on the same channel. In such a scenario, NAN group detection and channel interference remediation logic 190, predicts the destination of a NAN group and then causes any nearby APs 125 to change their channels. The result of such a scenario is depicted in FIG. 3, where none of the AP channels overlaps with nearby NAN group channels.

Approach (2): In another approach, the nearby AP can take ownership of individual NAN groups by becoming the Anchor master (by setting high master priority). In this mode, the AP can redirect the group communication to another channel, not in use by APs in the local area. That is, NAN group detection and channel interference remediation logic 190, instead of moving the AP's channel, causes the nearby AP to move the NAN group's channel. FIG. 3 could also be the result of this approach.

Approach (3): In still another approach, when multiple NAN groups are in the same area, they may use uncoordinated rendezvous points (because their master is not in range of one another). In this scenario, NAN group detection and channel interference remediation logic 190 can cause the AP to use clock sync to override the master announcements and force the various groups to meet at the same time, thus limiting the impact on the wireless infrastructure traffic.

Approach (4): In yet another approach, NAN group detection and channel interference remediation logic 190 can cause large and noisy groups to be broken by increasing the announced hop count to the master. When a single group is deconstructed (over a large area), participating APs can coordinate to set each sub-group to a channel that is not disruptive to the wireless infrastructure and relay traffic between the sub groups.

Regarding approach (2), there may be several elements to consider.

The NAN group master selects the communication channel and informs the group members. Therefore, the view of the 'best channel' to use depends on the master's view on the one hand, and on any adaptive mechanisms implemented, on the other hand. Therefore, if the NAN group master is outside of the AP 425(2) service area 435(2), then the master may choose a channel that will overlap with the AP 425(2) channel (it may also, of course, chose a different channel).

Once a channel is chosen, NAN makes no provisions on when the channel will be changed. In some implementations a static initial channel is used (which does not give any consideration to possible overlap with a nearby AP channel until performance degrades to the point of non-usability from the point of view of the master). Other implementations may use initial adaptation mechanisms, but these mechanisms may not account for anything else other than the master's view.

In the hidden node scenario, where a NAN group partially overlaps with an AP cell, the collisions degrade the experience of both the NAN group members and cell STAs (in the collision area). The master may not be aware of the issue (because it does not detect the AP). In this scenario, changing the AP channel is one possible remediation technique. However, such a change may be difficult because of the channel plan (i.e., such a change could negatively affect multiple users in multiple other cells). A dynamic channel assignment (DCA) of the RRM system may then compute that the outcome would be better if the overlapping NAN group changes to another channel.

In general, the "interest" of NAN group members is to meet and exchange via the service (then exchange data if applicable). Success of these operations is part of the group interest, and collisions with nearby systems is not in the group's interest. However, NAN has no mechanism to detect such collision issues (if the NAN master is not directly affected). The techniques described herein thus allow for higher success rate in the exchanges.

Regarding remediation approach (3), the purpose of NAN is to provide rendezvous points in time, windows of times where member of a group can meet so as to exchange information on services (i.e., exchanges that can happen between members). At the time rendezvous point provided by the master, a window opens when participating STAs can describe the service(s) they provide, hear others NAN broadcasts, and provide a time window where further data exchange is provided.

When two groups are in the same area, with STAs hearing both groups, but where the masters are not in range of one another (this can easily happen in a stadium environment, where people can create absorption at ground level while the signal to and from the AP on the ceiling is still clear), the following hidden node issue between NAN groups can happen.

At time t0, group 1 starts the discovery window. STA1 in group 1 gives a rendezvous point for service 1 data sharing at time t1.

At time t1, STAs in group 1 tune in to receive STA1 data, causing that spectrum to be busy with STA1 data transmission. At the same time, a group 2 discovery window starts, and fails because STA1 traffic lasts for more than group 2 discovery window.

In a variation of the same issue, STA1 (in group 1) and STA2 (in group 2) give overlapping data transmission windows, because they are in different groups, did not sync, and did not consider the other's transmission window. When STAs in group 2 tune in to the window, they find STA 1 traffic and timeout. As such, one of the groups fails to achieve its goal.

In a variation of the same issue, where the STAs do not use a default data channel identical to the discovery channel, STA1 may be on the data channel while group 2 is in a discovery window. This prevents the NAN group browser functions from operating properly.

The foregoing issue can be resolved by helping both groups in the same area gain awareness of each other. This is achieved, in accordance with an embodiment, by ensuring that both groups can hear each other's service and data window information exchanges. The AP, being in range of both groups, can help this awareness by, at the behest of NAN group detection and remediation logic 190, taking the master role and setting the discovery window for both group to be set at the same time.

As both groups share the same discovery window, they share the same time window to inform one another about their services. However, the tradeoff chosen is 'shared time' or 'collisions because of cell overlap'. This solution does not solve the issue that a high density of STAs have to share time slices. The foregoing approach limits the collisions by ensuring mutual awareness.

It is again noted that in the NAN process, the discovery window is used for STAs offering services to advertise the same, then each STA offering service informs the others of a time window (and channel) where this data will be shared. By having both groups in the same discovery window, a STA in group 2 will hear the STA in group 1 offering a data window, and will (as per NAN) offer a different time window for its own data, thus limiting collisions.

Regarding Approach (4), it is noted that this technique does not necessitate the AP to operate on multiple channels. Rather, the goal is to break up the group in multiple channels when the group is large. The AP then acts as a relay between the nodes. If the group is very large, then more than one AP can be involved, each on its respective channel.

More specifically, in accordance with the NAN protocol, and as noted previously, the discovery window is limited in duration and impact on the cell. During that window, one or more STAs are going to advertise data exchange rendezvous points (time and channel). In most cases, the channel is going to be the same as the advertisement channel. In some cases, the STA may select and indicate another channel. In that case, as per NAN, the other STAs that may also advertise data exchange rendezvous points during the discovery window will announce the same channel as the first announcing STA and other times (otherwise, if they were advertising different channels, participating STAs would need to hop from channel to channel, which is impractical; if they were advertising similar rendezvous points in time, transmissions would collide).

If the data channel is different from the local AP channel, then there is no impact on the infrastructure (and no action is needed). If the data channel is the same as the local AP channel, then the NAN group traffic will affect the local AP cell.

In large groups, the consumed airtime may increase dramatically, because of the NAN process: the advertising STA sends its window of data transmissions, and other STAs can subscribe ("I'll be at the rendezvous point"). When these STAs are far away from each other, two events may occur. The STA that will transmit, needing to account for the farthest subscriber, and will thus send at low data rate, using more airtime. And, when STAs detect that the signal from the offering STA is low, they can ask for a relay (other subscribing STAs are requested and accept to relay, which extends the group size and worsens the consumed airtime, as the same frame is repeated).

In such a case, the AP can break the group by advertising the relay function. In this mode, participating STAs that are far from the transmitting STA will receive traffic through the AP, thus allowing the transmitting STA to send at a data rate compatible with its distance to the AP, instead of degrading to a low data rate.

Recall that, in a stadium environment, STA to AP signal ("ground to ceiling") is likely better than the STA to STA signal when STAs are not near each other (as the signal has multiple bodies to go through), therefore STA to STA data rate degrades faster than STA to AP for a comparable distance.

With this relay mode, the AP 125 expedites the distribution of data for the group. This has benefit for the infrastructure only if the transmission is also on the AP channel (otherwise, NAN transmission is slow but does not affect cell users).

When users are far enough away from each other such that the group spans across two or more AP cells, the neighboring APs are likely to be on different channels, so only one AP channel would be affected (if both APs are on the same channel and both affected, then APs can relay the traffic to one another). As the affected AP relays traffic, it will relay to the NAN STAs that are at the edge of the effected cell. This mode may be enabled when the STA-AP-EDGE STA consumed airtime is estimated to be less than STA-EDGE STA consumed airtime (this determination is trivial, as the AP initially detects the STA-EDGE STA frames, and also knows the STA-AP and AP-EDGE STA data rate).

In sum, NAN group detection and channel interference remediation logic 190 may be configured to employ an iterative learning scheme to detect P2P groups that form as users move and connect to exchange to NAN. This process enables NAN group detection and channel interference remediation logic 190 to learn, detect and predict location of P2P nodes, including when nearby APs are not on the P2P channels. NAN group detection and channel interference remediation logic 190 can also estimate the impact of the groups on the target channel. This information may fed into a mapping application for display for an administrator, but can also be used to improve the radio resource management (RRM) channel plan by predicting NAN stations location with respect to localized RF neighborhoods.

Figure 5:
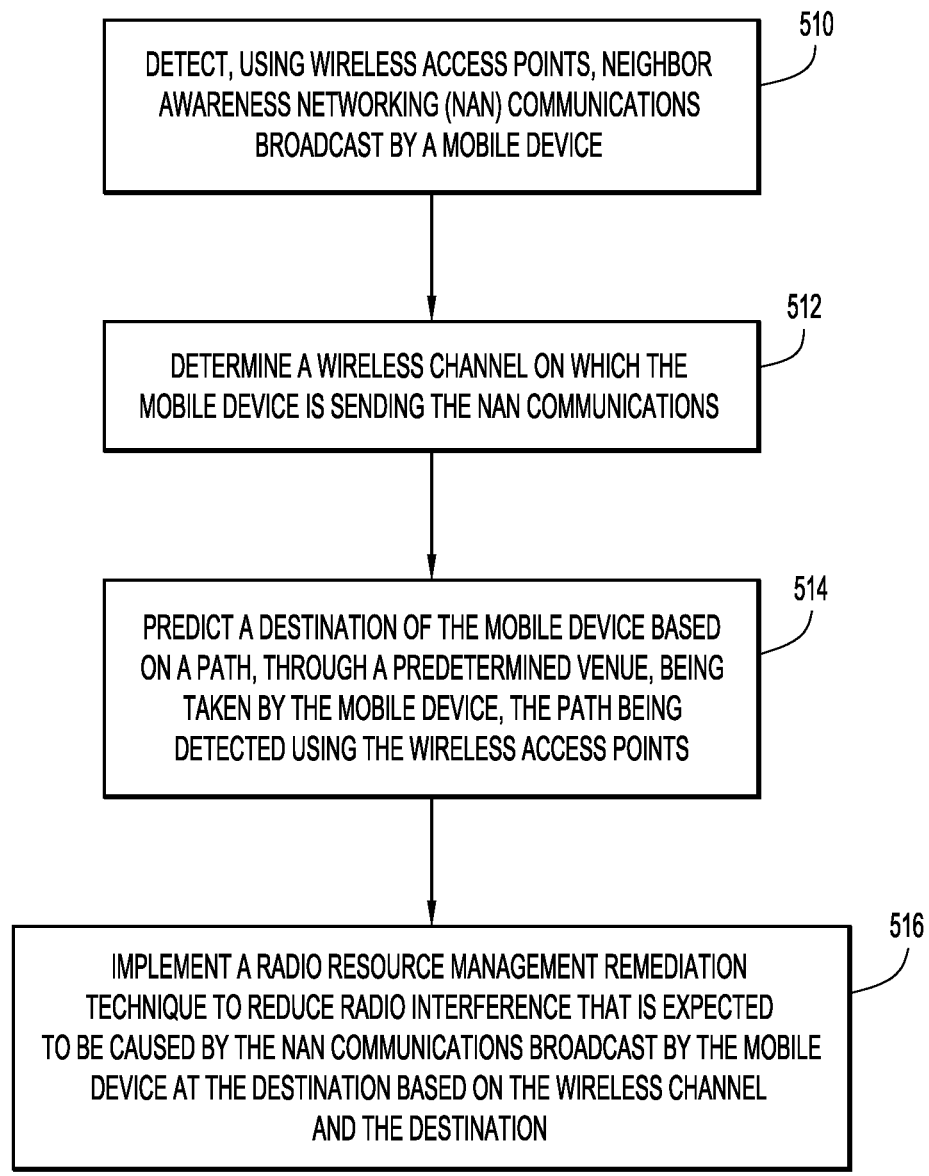
FIG. 5 is a flow chart depicting a series of operations performed by NAN group detection and channel interference remediation logic in accordance with an example embodiment.

FIG. 5 is a flow chart depicting a series of operations performed by NAN group detection and channel interference remediation logic 190n in accordance with an example embodiment. At operation 510, the logic is configured to detect, using wireless access points, neighbor awareness networking (NAN) communications broadcast by a mobile device. At operation 512, the logic is configured to determine a wireless channel on which the mobile device is sending the NAN communications. At operation 514, the logic is configured to predict a destination of the mobile device based on a path, through a predetermined venue, being taken by the mobile device, the path being detected using the wireless access points. And, at operation 516, the logic is configured to implement a radio resource management (RRM) remediation technique to reduce radio interference that is expected to be caused the NAN communications broadcast by the mobile device at the destination based on the wireless channel and the destination.

FIG. 6 depicts a device 600 (e.g., a server that executes NAN group detection and channel interference remediation logic 190) in accordance with an example embodiment. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs (e.g., NAN group detection and channel interference remediation logic 190) may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 614, cause the computing device 600 to perform the operations of, e.g., FIG. 5.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes detecting, using wireless access points, neighbor awareness networking (NAN) communications broadcast by a mobile device; determining a wireless channel on which the mobile device is sending the NAN communications; predicting a destination of the mobile device based on a path, through a predetermined venue, being taken by the mobile device, the path being detected using the wireless access points; and implementing a radio resource management remediation technique to reduce radio interference that is expected to be caused by the NAN communications broadcast by the mobile device at the destination based on the wireless channel and the destination.

The venue may include a high density wireless infrastructure such as might be found in a stadium or conference center.

In an embodiment, predicting the destination of the mobile device may include using machine learning.

In one embodiment, implementing the radio resource management remediation technique to reduce radio interference that is expected to be caused by the mobile device at the destination may be based on a number of mobile device participants in a NAN group at the destination In another embodiment, the radio resource management remediation technique may include changing a channel of operation of an access point that serves the destination.

In still another embodiment, the radio resource management remediation technique may include changing a channel of operation of an access point that serves an area adjacent the destination.

The radio resource management remediation technique may also include causing an access point that serves the destination to become a member of a NAN group that includes the mobile device, and causing the access point that serves the destination to become an anchor master of the NAN group and cause the NAN group to switch to a channel different from a channel being used by the access point that serves the destination.

The radio resource management remediation technique may still also include causing an access point that serves the destination to become a member of a NAN group that includes the mobile device, and to further operate as a NAN relay node.

The method still further include displaying an indication of a NAN group that includes the mobile device on a map of the predetermined venue.

In another form, a device may also be provided in accordance with an embodiment. The device may include an interface unit configured to enable network communications; a memory; and one or more processors coupled to the interface unit and the memory, and configured to: detect, using wireless access points, neighbor awareness networking (NAN) communications broadcast by a mobile device; determine a wireless channel on which the mobile device is sending the NAN communications; predict a destination of the mobile device based on a path, through a predetermined venue, being taken by the mobile device, the path being detected using the wireless access points; and implement a radio resource management remediation technique to reduce radio interference that is expected to be caused by the NAN communications broadcast by the mobile device at the destination based on the wireless channel and the destination.

In an embodiment the one or more processors may be configured to implement the radio resource management remediation technique to reduce radio interference that is expected to be caused by the mobile device at the destination based on a number of mobile device participants in a NAN group at the destination.

The radio resource management remediation technique may include changing a channel of operation of an access point that serves the destination.

The radio resource management remediation technique may include changing a channel of operation of an access point that serves an area adjacent the destination.

The radio resource management remediation technique may include causing an access point that serves the destination to become a member of a NAN group that includes the mobile device, and causing the access point that serves the destination to become an anchor master of the NAN group and cause the NAN group to switch to a channel different from a channel being used by the access point that serves the destination.

The radio resource management remediation technique may include causing an access point that serves the destination to become a member of a NAN group that comprises the mobile device, and to further operate as a NAN relay node.

In still another form, a non-transitory computer readable storage media is provided that is encoded with instructions that, when executed by a processor, cause the processor to detect, using wireless access points, neighbor awareness networking (NAN) communications broadcast by a mobile device; determine a wireless channel on which the mobile device is sending the NAN communications; predict a destination of the mobile device based on a path, through a predetermined venue, being taken by the mobile device, the path being detected using the wireless access points; and implement a radio resource management remediation technique to reduce radio interference that is expected to be caused by the NAN communications broadcast by the mobile device at the destination based on the wireless channel and the destination.

The instructions may further include instructions that, when executed by a processor, cause the processor to implement the radio resource management remediation technique to reduce radio interference that is expected to be caused by the mobile device at the destination based on a number of mobile device participants in a NAN group at the destination.

The radio resource management remediation technique may include causing an access point that serves the destination to become a member of a NAN group that includes the mobile device, and causing the access point that serves the destination to become an anchor master of the NAN group and cause the NAN group to switch to a channel different from a channel being used by the access point that serves the destination.

The radio resource management remediation technique may include causing an access point that serves the destination to become a member of a NAN group that comprises the mobile device, and to further operate as a NAN relay node.

The above description is intended by way of example only. Various modifications and structural changes may be made therein without departing from the scope of the concepts described herein and within the scope and range of equivalents of the claims.

What is claimed is:

1. A method comprising:
    detecting, using wireless access points, neighbor awareness networking (NAN) communications broadcast by a plurality of mobile devices participating in a NAN group;
    determining a wireless channel on which the NAN group is sending the NAN communications;
    predicting a destination of the NAN group based on a path, through a predetermined venue, being taken by the NAN group, the path being detected using the wireless access points; and
    implementing a radio resource management remediation technique to reduce radio interference that is expected to be caused by the NAN communications broadcast by the NAN group at the destination based on the wireless channel and the destination.

2. The method of claim 1, wherein the predetermined venue comprises a high density wireless infrastructure.

3. The method of claim 2, wherein the predetermined venue is one of a stadium or conference center.

4. The method of claim 1, wherein predicting the destination of the NAN group comprises using machine learning.

5. The method of claim 1, further comprising implementing the radio resource management remediation technique to reduce radio interference that is expected to be caused by the NAN group at the destination based on a number of mobile device participants in the NAN group at the destination.

6. The method of claim 1, wherein the radio resource management remediation technique comprises changing a channel of operation of an access point that serves the destination.

7. The method of claim 1, wherein the radio resource management remediation technique comprises changing a channel of operation of an access point that serves an area adjacent the destination.

8. The method of claim 1, wherein the radio resource management remediation technique comprises causing an access point that serves the destination to become a member of the NAN group, and causing the access point that serves the destination to become an anchor master of the NAN group and cause the NAN group to switch to a channel different from a channel being used by the access point that serves the destination.

9. The method of claim 1, wherein the radio resource management remediation technique comprises causing an access point that serves the destination to become a member of the NAN group, and to further operate as a NAN relay node.

10. The method of claim 1, further comprising displaying an indication of the NAN group on a map of the predetermined venue.

11. A device comprising:
    an interface unit configured to enable network communications;
    a memory; and
    one or more processors coupled to the interface unit and the memory, and configured to:
        detect, using wireless access points, neighbor awareness networking (NAN) communications broadcast by a plurality of mobile devices participating in a NAN group;
        determine a wireless channel on which the NAN group is sending the NAN communications;
        predict a destination of the NAN group based on a path, through a predetermined venue, being taken by the NAN group, the path being detected using the wireless access points; and
        implement a radio resource management remediation technique to reduce radio interference that is expected to be caused by the NAN communications broadcast by the NAN group at the destination based on the wireless channel and the destination.

12. The device of claim 11, wherein the one or more processors are configured to implement the radio resource management remediation technique to reduce radio interference that is expected to be caused by the NAN group at the destination based on a number of mobile device participants in the NAN group at the destination.

13. The device of claim 11, wherein the radio resource management remediation technique comprises changing a channel of operation of an access point that serves the destination.

14. The device of claim 11, wherein the radio resource management remediation technique comprises changing a channel of operation of an access point that serves an area adjacent the destination.

15. The device of claim 11, wherein the radio resource management remediation technique comprises causing an access point that serves the destination to become a member of the NAN group, and causing the access point that serves the destination to become an anchor master of the NAN group and cause the NAN group to switch to a channel different from a channel being used by the access point that serves the destination.

16. The device of claim 11, wherein the radio resource management remediation technique comprises causing an access point that serves the destination to become a member of the NAN group, and to further operate as a NAN relay node.

17. A non-transitory computer readable storage media encoded with instructions that, when executed by a processor, cause the processor to:
  detect, using wireless access points, neighbor awareness networking (NAN) communications broadcast by a plurality of mobile devices participating in a NAN group;
  determine a wireless channel on which the NAN group is sending the NAN communications;
  predict a destination of the NAN group based on a path, through a predetermined venue, being taken by the NAN group, the path being detected using the wireless access points; and
  implement a radio resource management remediation technique to reduce radio interference that is expected to be caused by the NAN communications broadcast by the NAN group at the destination based on the wireless channel and the destination.

18. The non-transitory computer readable storage media of claim 17, further including instructions that, when executed by the processor, cause the processor to implement the radio resource management remediation technique to reduce radio interference that is expected to be caused by the NAN group at the destination based on a number of mobile device participants in the NAN group at the destination.

19. The non-transitory computer readable storage media of claim 17, wherein the radio resource management remediation technique comprises causing an access point that serves the destination to become a member of the NAN group, and causing the access point that serves the destination to become an anchor master of the NAN group and cause the NAN group to switch to a channel different from a channel being used by the access point that serves the destination.

20. The non-transitory computer readable storage media of claim 17, wherein the radio resource management remediation technique comprises causing an access point that serves the destination to become a member of the NAN group, and to further operate as a NAN relay node.

* * * * *